United States Patent
Ma et al.

(10) Patent No.: US 8,584,644 B2
(45) Date of Patent: Nov. 19, 2013

(54) ENGINE FOR AN AIR HYBRID VEHICLE

(75) Inventors: Thomas Tsoi-Hei Ma, South Woodham Ferrers (GB); Hua Zhao, Gerrards Cross (GB)

(73) Assignee: Brunel University, Uxbridge, Middlesex (GB)

( * ) Notice: Subject to any disclaimer, the term of this patent is extended or adjusted under 35 U.S.C. 154(b) by 294 days.

(21) Appl. No.: 12/864,485

(22) PCT Filed: Feb. 23, 2009

(86) PCT No.: PCT/GB2009/050177
§ 371 (c)(1),
(2), (4) Date: Jul. 23, 2010

(87) PCT Pub. No.: WO2009/106881
PCT Pub. Date: Sep. 3, 2009

(65) Prior Publication Data
US 2010/0307440 A1    Dec. 9, 2010

(30) Foreign Application Priority Data
Feb. 28, 2008    (GB) .................................. 0803685.7

(51) Int. Cl.
*F02N 11/08*    (2006.01)
(52) U.S. Cl.
USPC ................... 123/179.3; 123/321; 180/165
(58) Field of Classification Search
USPC ............ 123/62, 66, 72, 90.15, 179.3, 179.31, 123/179.4, 198 F, 321, 322, 481, 90.14, 123/184.24, 308; 417/364; 180/165
See application file for complete search history.

(56) References Cited

U.S. PATENT DOCUMENTS

| | | | | |
|---|---|---|---|---|
| 3,710,908 | A | * | 1/1973 | Muir ............................... 477/90 |
| 3,958,900 | A | * | 5/1976 | Ueno ............................ 417/237 |
| 4,928,648 | A | | 5/1990 | Schatz et al. |

(Continued)

FOREIGN PATENT DOCUMENTS

| | | |
|---|---|---|
| DE | 19837094 | 2/2000 |
| EP | 1747351 | 1/2007 |

(Continued)

*Primary Examiner* — Stephen K Cronin
*Assistant Examiner* — John Zaleskas
(74) *Attorney, Agent, or Firm* — Shalom Wertsberger; Saltamar Innovations

(57) ABSTRACT

An engine for use in an air hybrid vehicle comprises at least one cylinder having a piston (20) defining a variable volume working chamber (10) and intake (12, 14) and exhaust (16) valves controlling the flow of air into and out of the working chamber. The cylinder is operable in any one of at least two modes, namely a first mode in which power is generated by burning fuel in the working chamber (10), and a second mode in which the cylinder acts to compress air drawn into the working chamber (10) and to store the compressed air in an air tank (36). The engine further comprises a non-return valve (32) in an intake port leading to an intake valve (12) of the cylinder so as to define an auxiliary chamber (30) in the intake port between the intake valve (12) and the non-return valve (32). A passage (24) connecting the auxiliary chamber (30) to the air tank (36) contains a valve (34) for controlling the flow of compressed air between the auxiliary chamber (30) and the air tank (36). In the invention, a stop (40) is provided which is operative to prevent full closure of the intake valve (12) when the engine is operating in the second mode, whereby the air compressed in the working chamber by the movement of the piston is admitted through the open intake valve (12) into the auxiliary chamber (30).

6 Claims, 1 Drawing Sheet

(56) References Cited

U.S. PATENT DOCUMENTS

| | | |
|---|---|---|
| 4,986,225 A | 1/1991 | Wu et al. |
| 6,223,846 B1 * | 5/2001 | Schechter .................... 180/165 |
| 6,302,076 B1 * | 10/2001 | Bredy ...................... 123/184.21 |
| 6,866,017 B2 * | 3/2005 | Ruggiero et al. ............. 123/321 |
| 6,922,997 B1 * | 8/2005 | Larson et al. .................. 60/611 |
| 7,050,900 B2 * | 5/2006 | Miller et al. .................. 701/103 |
| 7,380,525 B2 * | 6/2008 | Ma et al. ..................... 123/48 D |
| 2003/0164163 A1 * | 9/2003 | Lei et al. .................. 123/568.14 |
| 2005/0182553 A1 | 8/2005 | Miller et al. |

FOREIGN PATENT DOCUMENTS

| | | |
|---|---|---|
| FR | 2833650 | 6/2003 |
| FR | 2873405 | 1/2006 |
| GB | 2402169 | 12/2004 |
| GB | 2422872 | 8/2006 |

\* cited by examiner

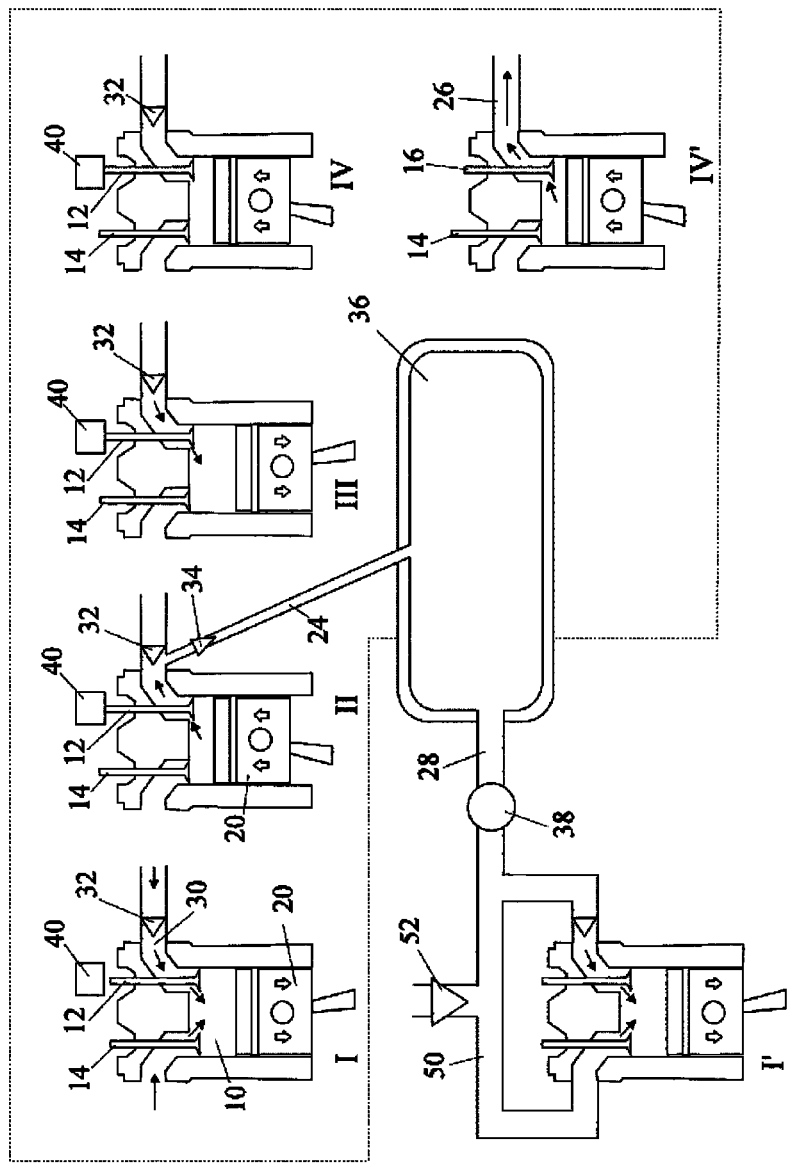

ENGINE FOR AN AIR HYBRID VEHICLE

FIELD OF THE INVENTION

The present invention relates to an internal combustion engine for an air hybrid vehicle in which regenerative braking is achieved by utilizing compressed air energy and to vehicles including such an engine.

BACKGROUND OF THE INVENTION

It is known that a regenerative hybrid vehicle can achieve significant reduction in fuel consumption (hence $CO_2$ reduction) by recovering some of the kinetic energy of the vehicle during deceleration or braking of the vehicle and transforming it into another form of energy which can be stored for future use. One example is the electric hybrid vehicle in which the braking energy is transformed into electric energy and stored in an electric battery. Another example is the inertia hybrid vehicle in which the braking energy is transformed into inertial energy and stored in a spinning flywheel. A still further example is the pneumatic hybrid vehicle in which the braking energy is transformed into pneumatic energy and stored in a compressed air tank. The compressed air can be used to power the vehicle, if the engine can be operated in an air motor mode, or to improve the performance of the engine when it is firing, by increasing the intake manifold pressure in a manner analogous to a supercharger. In the latter case, the compressed air can also be used to compensate for turbo lag if the engine is turbocharged.

The Applicants' earlier EP Patent 1 747 351 discloses a method of operating an internal combustion engine having an engine cylinder with a reciprocating piston, first and second intake ports for admitting gas from an ambient air supply into the engine cylinder, first and second intake valves each arranged between a respective one of the intake ports and the engine cylinder, a non-return valve arranged in the second of the intake ports at a distance from the second intake valve and oriented to allow gas to flow only towards the engine cylinder, and a variable valve actuating system for controlling the opening and closing of at least the second intake valve. The engine has an operating mode in which the second intake valve is opened and closed while the cylinder is fully isolated from the ambient air, to permit gas transfer between the cylinder and an auxiliary chamber temporarily defined by the part of the second intake port lying between the second intake valve and the non-return valve. When the second intake valve is opened, the pressure in the auxiliary chamber is greater than the pressure of the ambient air supply such that no gas escapes past the non-return valve.

The above patent, which is believed to constitute the closest prior art to the present invention, requires the presence of two intake ports and, more significantly, a variable valve actuating system, both of which introduce complexities and add to manufacturing cost.

OBJECT OF THE INVENTION

The present invention seeks therefore to provide a modification of the engine in EP 1 747 351 which enables implementation of the air compressor mode of operation in a simpler and more cost effective manner.

SUMMARY OF THE INVENTION

According to the present invention, there is provided engine for use in a hybrid vehicle comprising at least one cylinder having a piston defining a variable volume working chamber and intake and exhaust valves controlling the flow of air into and out of the working chamber, wherein the cylinder is operable in any one of at least two modes, namely a first mode in which power is generated by burning fuel in the working chamber, and a second mode in which the cylinder acts to compress air drawn into the working chamber and to store the compressed air in an air tank, the engine further comprising a non-return valve in an intake port leading to an intake valve of the cylinder so as to define an auxiliary chamber in the intake port between the intake valve and the non-return valve, a passage connecting the auxiliary chamber to the air tank, and a valve for controlling the flow of compressed air between the auxiliary chamber and the air tank, characterised in that a stop is provided which is operative to prevent full closure of the intake valve when the engine is operating in the second mode, whereby the air compressed in the working chamber by the movement of the piston is admitted through the open intake valve into the auxiliary chamber.

Though the stop in the invention is only strictly required to maintain the intake valve open during a compression period, in the preferred embodiment of the invention, the stop is an abutment that remains stationary throughout the engine cycle when the engine is operating in compressor mode. Unlike a variable valve timing system, the stop does not need to move in synchronism with the rotation of the crankshaft and it uses no power while it is in place. The stop can act on a cam follower, an actuating rocker or another component of the valve train, merely to ensure that even when the cam follower is aligned with the base circle of the cam that opens and closes the valve during normal operation of its cylinder, the valve does not close fully against its valve seat. If there is sufficient clearance for the valve when the piston is at top dead center, the valve can remain fully open at all times but otherwise the stop ensures that it remains partially open, in a position where collision with the piston is avoided.

If the engine has two intake ports per cylinder, only one of the intake ports needs to act as a compressor chamber but if the engine has only one intake port per cylinder, there is no reason why that port should not act both as an intake port and as the compressor chamber.

In the case the engine has two intake ports per cylinder and one of the intake ports acts as a compression chamber, a throttle valve may additionally be provided in series with and upstream of the non-return valve. This throttle valve may be closed during the compressor mode so as to reduce the differential gas loading on the non-return valve.

During engine braking, the engine is operated with unrestricted air flow to the intake port, with the fuel supply shut off and with the stop activated so that the compressed air produced during the compression period of the engine is forced past the unclosed gap of the intake valve into the auxiliary chamber and through to the compressed air storage tank.

During engine driving, the engine is operated with the stop retracted and therefore not interacting with the intake valve in any way. If desired, compressed air from the compressed air storage tank can be delivered into the intake manifold of the engine so that the compressed air is used to motor the engine and/or support combustion in the engine.

During stop/start operation, the engine can be switched off for a short period, to be subsequently re-started using the compressed air from the compressed air storage tank.

In the above stop/start operation, the engine may itself be designed to operate in a third mode as an air driven motor. Alternatively, however, the engine may be re-started by delivering the compressed air from the compressed air storage tank to a separate compressed air driven starter motor temporarily engaged with the engine for cranking the engine.

A stop for maintaining a valve partially open has already been used in engines for heavy vehicle capable of producing very high engine braking. In such prior art engines, the stop acts on the exhaust valve of the engine, to make the valve act as a throttling aperture connected to the ambient atmosphere through the exhaust system. During compression periods, air is pumped through the throttling aperture out of the cylinder, resulting in an energy loss, and a further energy loss occurs in sucking air back through this throttling aperture during expansion periods. The braking energy in this case is simply dissipated into heat and is not stored for subsequent regenerative use.

Preferably, a valve is provided between the air tank and the engine intake manifold at the entrance of the intake manifold of the engine from the ambient air. In this way, when the compressed air from the air storage tank is delivered for regenerative use into the intake manifold, the valve is closed to prevent any pressurized air in the intake manifold from escaping to the ambient atmosphere through the entrance of the intake manifold. This valve may be a non-return valve or a throttle valve.

To reduce turbo-lag in a turbocharged engine, a pressure regulator may be provided for delivering a predetermined boost air pressure into an intake manifold of the engine from the air tank.

BRIEF DESCRIPTION OF THE DRAWING

The invention will now be described further, by way of example, with reference to the accompanying drawings in which the single FIGURE shows the engine braking and compressed air storage cycle of the present invention.

DETAILED DESCRIPTION OF THE PREFERRED EMBODIMENT

The diagrams enclosed within the box drawn in a dotted line in the accompanying drawing all show sectional views of an engine cylinder going through the four strokes of an engine braking cycle. The strokes are labelled in roman numerals and represent the intake stroke I, the compression stroke II, the power stroke III and the exhaust stroke IV.

The cylinder shown in all the diagrams has a combustion chamber 10 and a piston 20 connected in the normal way to a crankshaft (not shown). Air is admitted into the combustion chamber through two intake valves 12 and 14 and is discharged through an exhaust valve 16. The four diagrams at the top of the box show the two intake valves 12 and 14 while the lower diagram shows an intake valve 14 and an exhaust valve 16 during the exhaust stroke IV.

The intake port leading to the valve 12 contains a non-return valve 32 and a small auxiliary chamber 30 is defined between the seat of the valve 12 and the non-return valve 32. A passage 24 controlled by a control valve 34, which may be another non-return valve, leads from the auxiliary chamber 30 to an air storage tank 36. The tank 36 is in turn connected by way of a passage 28 containing a valve 38, which may be a pressure regulating valve, to the intake manifold 50. The manifold 50, as shown in the diagram lying outside the dotted line box, is connected to all the intake ports. A further non-return valve 52 is provided at the entrance of the intake manifold 50 to prevent pressurised air from being discharged from the manifold 50 into the ambient atmosphere.

If operating as a fuel burning engine, the valve operation during the four strokes is entirely conventional and is not shown in the drawing. In particular, during the intake stroke I the two intake valves 12 and 14 are opened and the exhaust valve(s) 16 is closed to admit a fresh air and fuel charge into the engine. In the compression stroke II, all the valves are closed and the charged is compressed. At the end the compression stroke, combustion is initiated and the valves remain closed so that increased temperature and pressure force the piston downwards during the power stroke III. Finally, during the exhaust stroke IV, the exhaust valve 16 opens and the burnt gases are discharged.

For operation as an air compressor, the valves continue to be operated by the same cams and attempt to open and close in the same way as they would during normal engine operation as described above. However, the control system effects certain changes that are maintained for as long as the engine is operating as a compressor. The changes are that the fuelling is discontinued and a stop 40 is moved into a position in which it prevents the valve 12 from closing fully.

A stop which prevents a valve from closing is already known and, as previously described, can be used to effect compression braking. For example, in a push rod engine, the stop may act on a valve operating rocker to keep the valve slightly open even if the cam follower is on the cam base circle. In an overhead camshaft engine, the stop may project directly into the path of a cam follower mounted on the end of the valve. In the present invention, such a stop 40 is used to prevent an intake valve 12 from closing fully at least during the compression stroke II. In the preferred embodiment, the stop 40 remains in place throughout all four strokes for as long as it is required that the engine operate in compressor mode.

Referring again to the drawing, in stroke I, the intake valves 12 and 14 are opened and closed normally by a camshaft (not shown) while the piston 20 is moving downwards, so that fresh air is drawn into the combustion chamber 10 through the open intake valves 12 and 14. The non-return 32 will be open in the flow direction towards the engine.

In stroke II, the intake valve 14 is fully closed in the normal way, but the intake valve 12 is prevented from closing completely by the stop 40. The stop 40, in the preferred embodiment, is hydraulically operated to arrest the movement of the valve 12 before it reaches its valve seat, thereby maintaining the valve 12 partially open.

The stop 40 remains in the stopping position for the rest of the engine cycle and for many engine cycles until it is deactivated. The camshaft of the engine still opens and closes the intake valve 12 normally during the intake stroke of the engine cycle, but the intake valve 12 only moves towards and away from the position set by the stop 40 rather than its valve seat.

During stroke II, the piston 20 moves upwards, compressing the full charge of intake air towards TDC (top dead center) at an effective compression ratio nearly the same as the geometric compression ratio of the engine. This is because only a small amount of air leakage can occur through the partially open intake valve 12. In this context, one should bear in mind that any flow trying to get past the small gap will be choked under sonic flow conditions and the maximum leakage can only occur at the top of compression when the air density is at the highest value. The mass of air passing through the gap is the product of the area of the gap, the velocity of air movement through the gap and the density of the air. As the gap area and flow velocity are restricted, it is only when the air density is high that any substantial mass of air can be discharged from the combustion chamber. The presence of the auxiliary chamber 30 thus has little effect on the effective compression ratio because it is substantially isolated from the cylinder 10 by the small slightly open gap in the intake valve 12.

This should be contrasted with the compression mode of EP 1 747 351, in which the intake valve 12 is opened wide and the auxiliary chamber 30 is freely connected to the working chamber 10 so that its volume becomes an integral part of the cylinder volume. As a result, the effective compression ratio is significantly lower than the geometric compression ratio. For example, if the volume of the auxiliary chamber 30 is the same as the clearance volume in the cylinder 10, the effective compression ratio will be only half of the geometric compression ratio of the engine.

Thus comparing the compression torque produced during stroke II, the present invention will yield a significantly higher braking torque than in EP 1 747 351 because of the higher effective compression ratio during stroke II.

In the meantime, in stroke II in the present invention, some air will leak past the unclosed gap in the intake valve 12 into the auxiliary chamber 30, especially when the piston 20 is approaching TDC and the density of the compressed air is increasing to a maximum value at the top of the compression. This air at high compression pressure will then escape from the auxiliary chamber 30 into the air storage tank 36 via the self-sealing one-way valve 34 and the passage 24.

In stroke III, a high vacuum is generated in the cylinder 10 as the piston 20 moves downwards creating a negative torque on the engine crankshaft. A small quantity of air may be drawn into the auxiliary chamber 30 through the non-return valve 32 during stroke III but it will play no significant part in the engine braking cycle.

In stroke IV', as shown in the diagram at the lower right corner of the dotted-line box, the exhaust valve 16 is opened normally by the camshaft and the cylinder content is discharged through the exhaust valve 16 and the exhaust pipe 26.

The diagram outside the dotted-line box in the bottom left corner of the accompanying drawing shows a sectional view of an engine cylinder at intake stroke I' across the intake valves supplied by the intake manifold 50 which also supplies other cylinders adjacent to this cylinder. The manifold non-return valve 52 guards the entrance of the intake manifold 50 so that when the compressed air from the air storage tank 36 is delivered for regenerative use into the intake manifold 50 behind the non-return valve 52, controlled by the dispensing valve 38, the non-return valve 52 prevents any compressed air from escaping to the ambient atmosphere through the entrance of the intake manifold 50.

The dispensing valve 38 may be a pressure regulator for delivering a predetermined boost air pressure into the intake manifold 50. This will provide an immediate boost and reduce the turbo-lag normally experienced in a turbocharged engine during rapid acceleration.

During stop/start operation, the engine may be switched off while the vehicle is at a standstill and re-started using the compressed air from the compressed air storage tank 36. The engine may be re-started by delivering the compressed air into the intake manifold 50 of the engine as described earlier. Alternatively it may be re-started by delivering the compressed air from the compressed air storage tank to a compressed air driven starter motor temporarily engaged with flywheel ring gear of the engine for cranking the engine.

The engine of the present invention is especially suitable for application in heavy vehicles with regenerative braking, including buses and trucks.

The invention claimed is:

1. An engine comprising:
at least one cylinder having a piston defining a variable volume working chamber;
wherein the cylinder is operable in any one of at least two modes, the first mode being where power is generated by burning fuel in the working chamber, and the second mode being where the cylinder acts to compress air admitted into the working chamber and to store the compressed air in an air tank;
the engine further comprising:
an intake manifold;
a cam actuated intake valve for controlling flow of air into and out of the working chamber;
an intake port in fluid communication with the intake valve and the intake manifold;
a non-return valve situated in the intake port, so as to define an auxiliary chamber in the intake port between the intake valve and the non-return valve, the auxiliary chamber being in fluid communication with the air tank via a control valve;
a selectively deployable stop situated to prevent full closure of the intake valve regardless of the position of the intake valve actuating cam when the stop is deployed, whereby the air compressed in the working chamber by the movement of the piston is admitted through the open intake valve into the auxiliary chamber;
wherein the stop comprises an abutment that remains stationary throughout the engine cycle operation in the second mode.

2. An engine as claimed in claim 1, wherein the air tank is in fluid communication with the intake manifold, and further comprising a pressure regulator for controlling the fluid communication between the air tank and the intake manifold, for delivering a predetermined boost air pressure from the air tank into the intake manifold during engine operation in the first mode.

3. An engine as claimed in claim 2, further comprising a valve situated at an entrance to the intake manifold from the ambient atmosphere, for preventing any pressurized air in the intake manifold from escaping to the ambient atmosphere through the entrance of the intake manifold.

4. A hybrid vehicle comprising: an engine comprising: at least one cylinder having a piston defining a variable volume working chamber wherein the cylinder is operable in any one of at least two modes, the first mode being where power is generated by burning fuel in the working chamber, and the second mode being where the cylinder acts to compress air admitted into the working chamber and to store the compressed air in an air tank; the engine further comprising: an intake manifold; cam actuated intake and exhaust valves controlling flow of air into and out of the working chamber, an intake port in fluid communication with the intake valve and the intake manifold; a non-return valve situated in the intake port, so as to define an auxiliary chamber in the intake port between the intake valve and the non-return valve, the auxiliary chamber being in fluid communication with the air tank, via a control valve; a selectively deployable stop situated to prevent full closure of the intake valve regardless of the position of the intake valve actuating cam when the stop is deployed, whereby the air compressed in the working chamber by the movement of the piston is admitted through the open intake valve into the auxiliary chamber; wherein the stop is deployed only when the engine is the second mode; wherein the stop comprises an abutment that remains stationary throughout the engine cycle operation in the second mode; and, the vehicle further comprising a control system for switching off the engine when the vehicle is at a standstill and for restarting engine using compressed air from the air tank when vehicle movement is to be resumed.

5. A hybrid vehicle as claimed in claim 4, further comprising an air motor separate from the engine, for restarting the engine using compressed air from the air tank.

6. A hybrid vehicle as claimed in claim 4 wherein the air tank is in fluid communication with the intake manifold, and further comprising a pressure regulator for controlling the fluid communication between the air tank and the intake manifold, for delivering a predetermined boost air pressure from the air tank into the intake manifold.

* * * * *